May 5, 1970  R. R. WEIS ET AL  3,509,799
BAG-FORMING METHOD
Filed Aug. 4, 1967  10 Sheets-Sheet 1

INVENTORS:
RUDOLF R. WEIS
ELLSWORTH A. HARTBAUER

Stanley Bialos
ATTORNEY

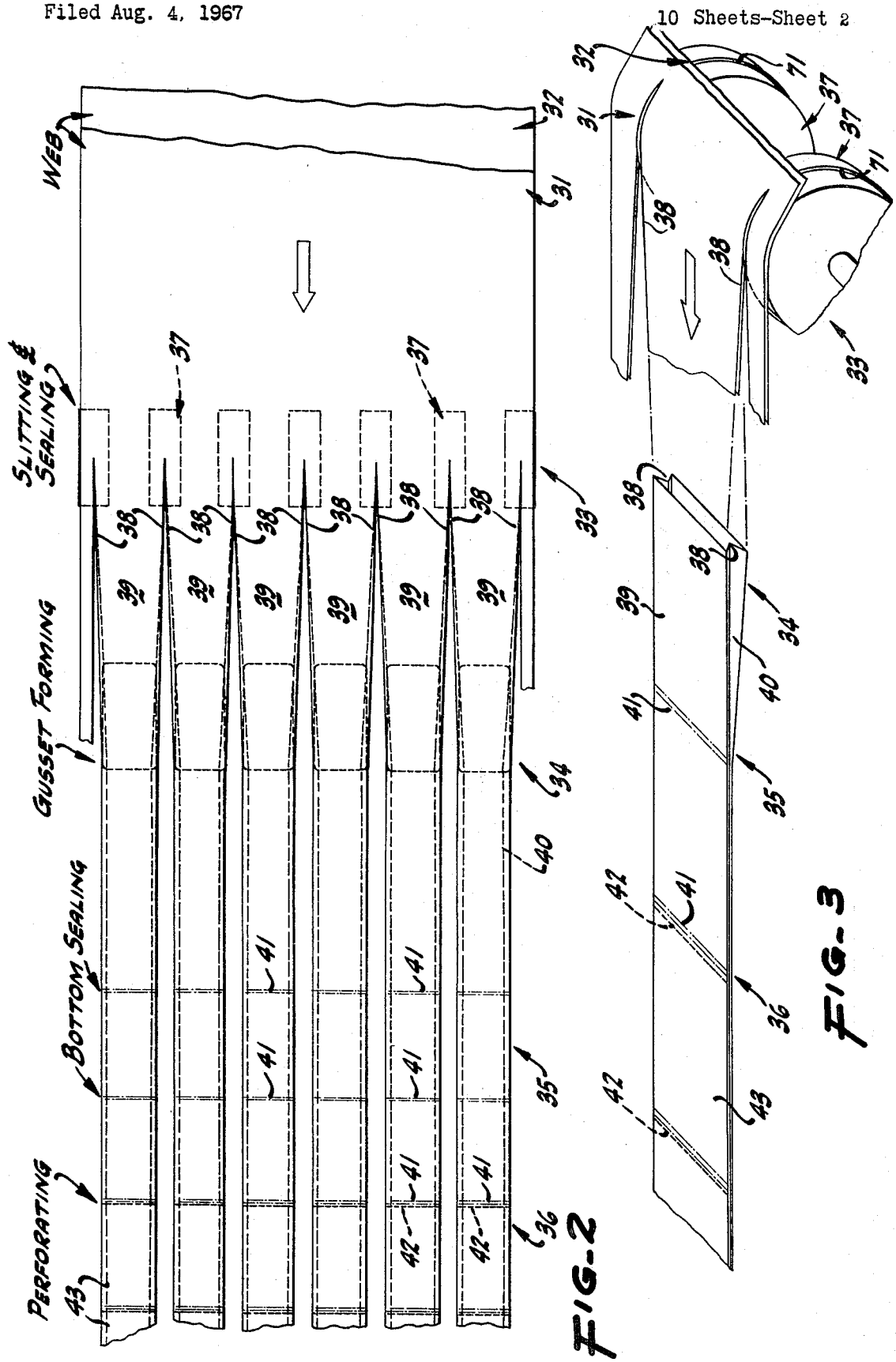

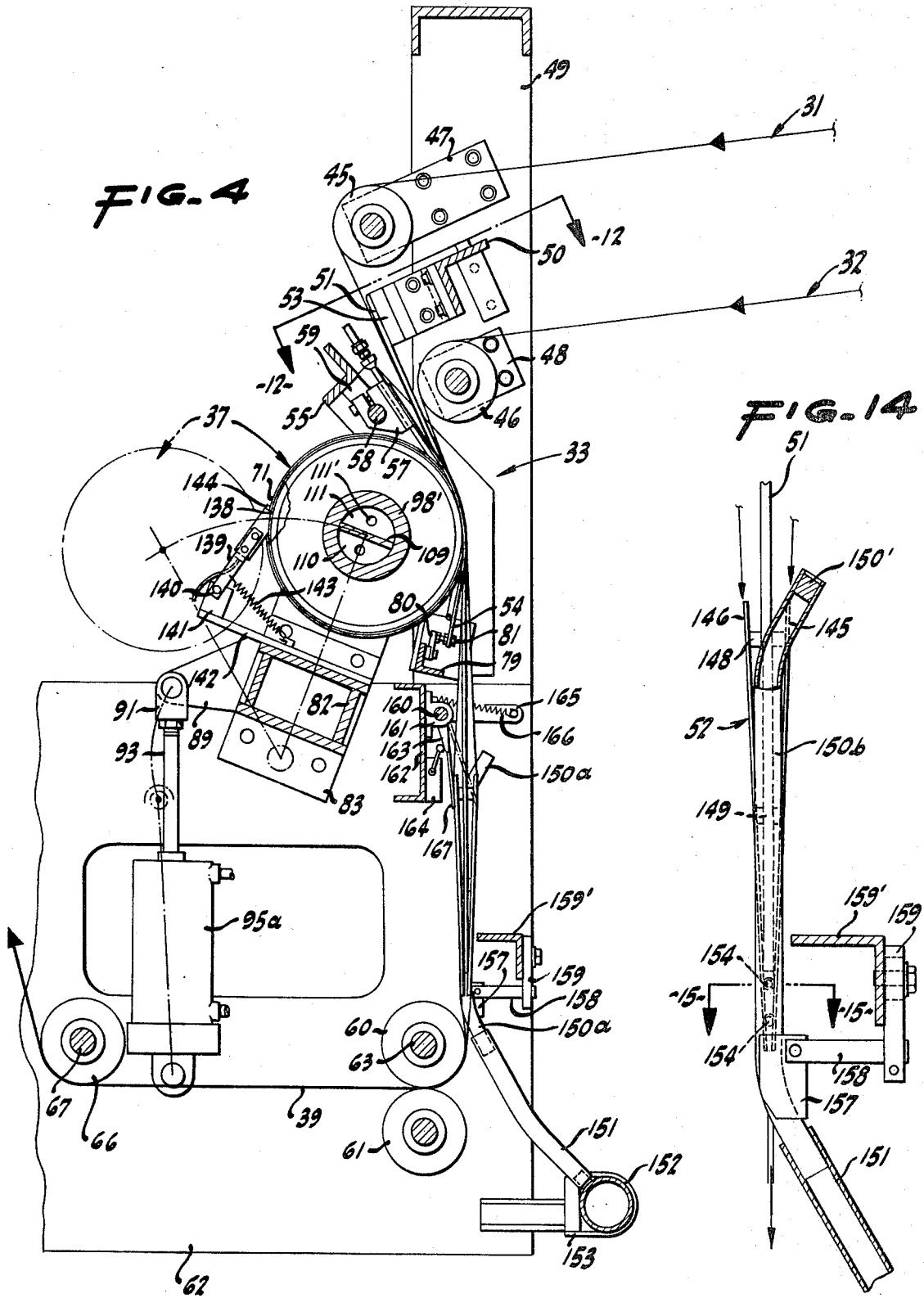

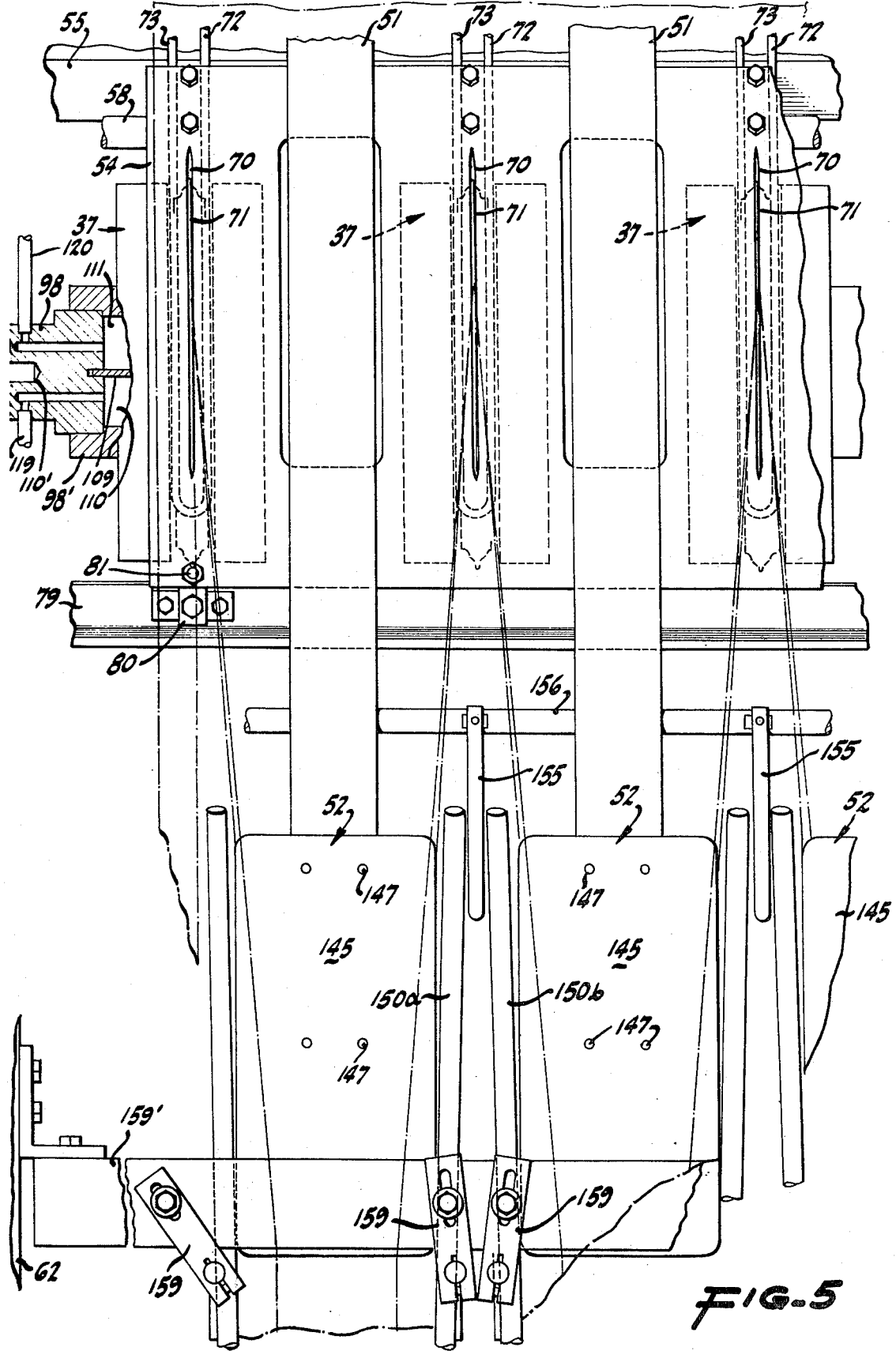

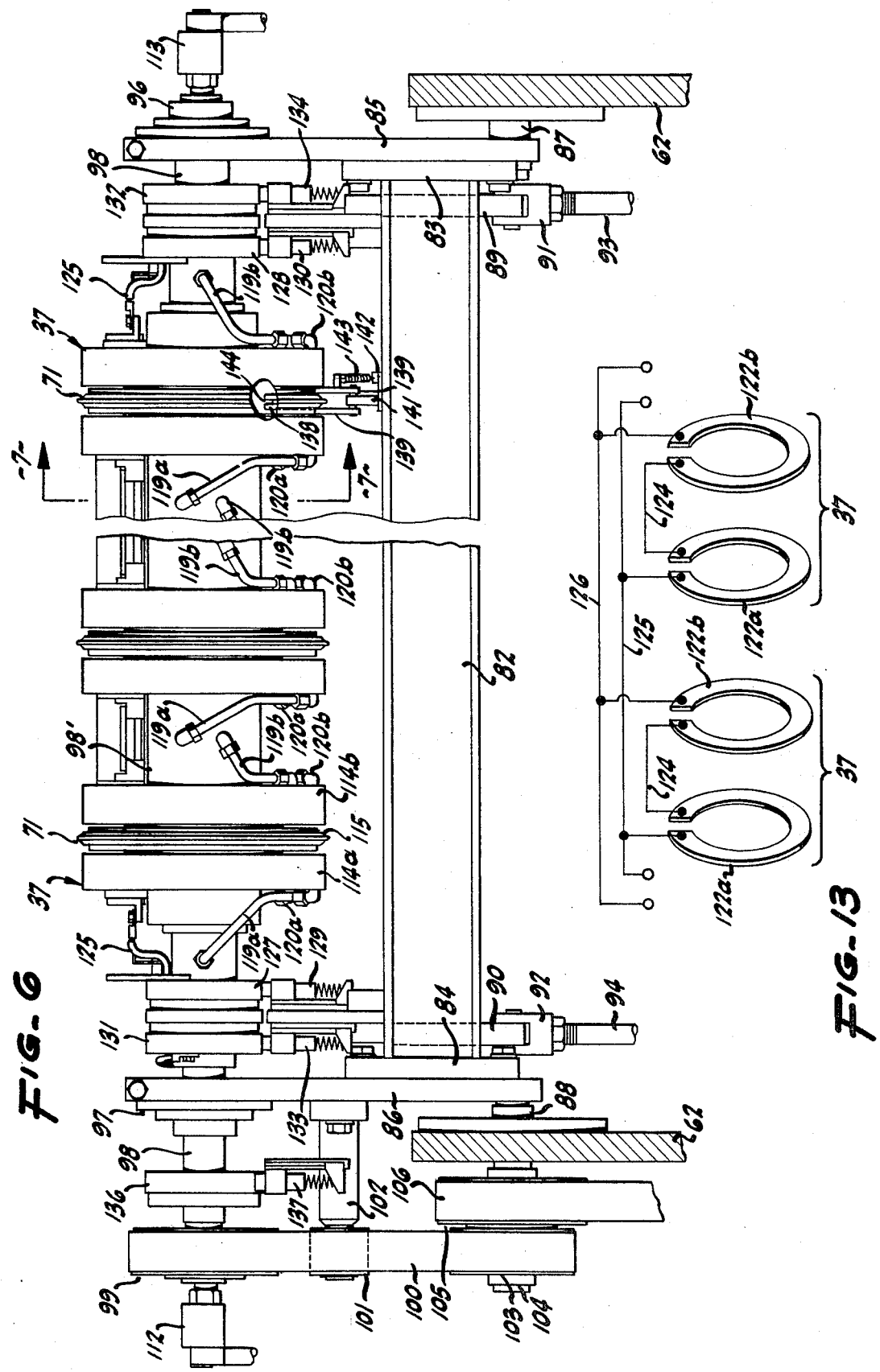

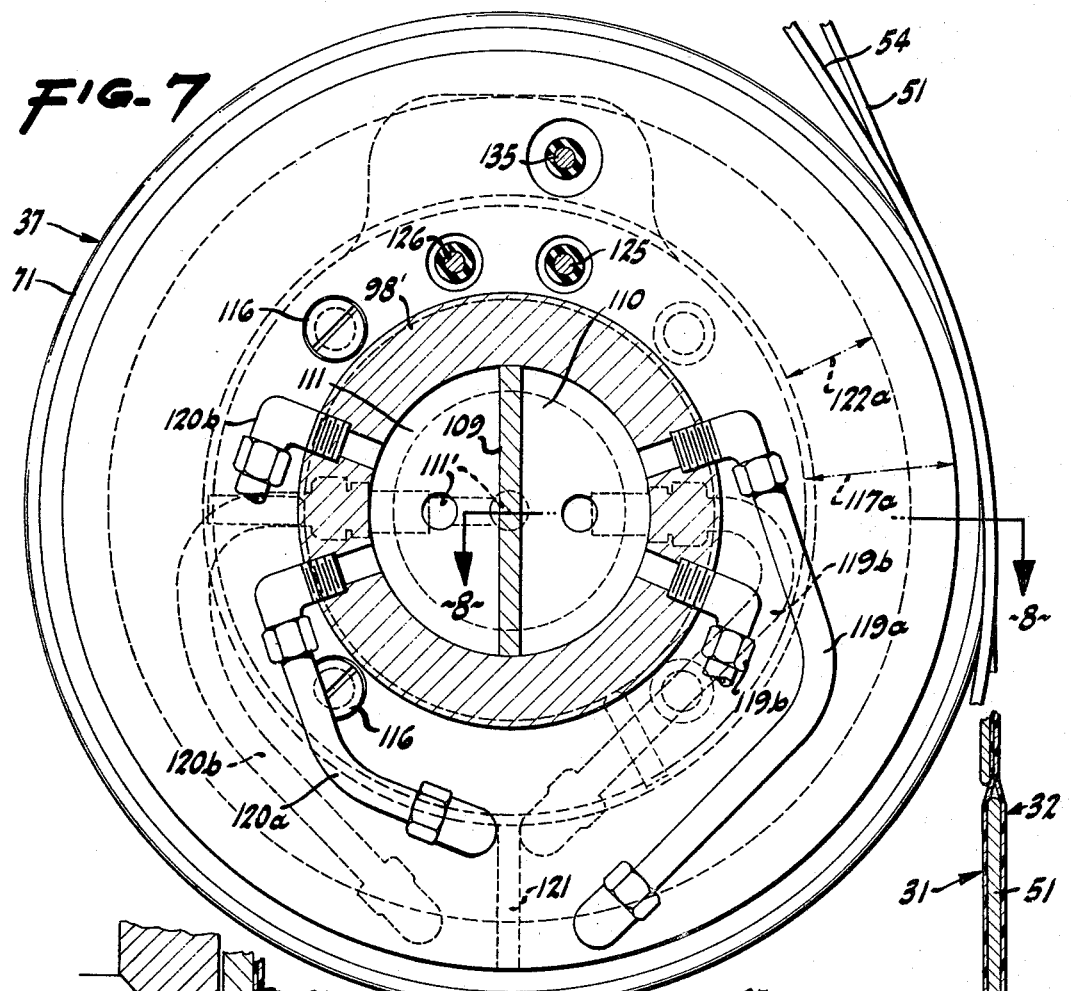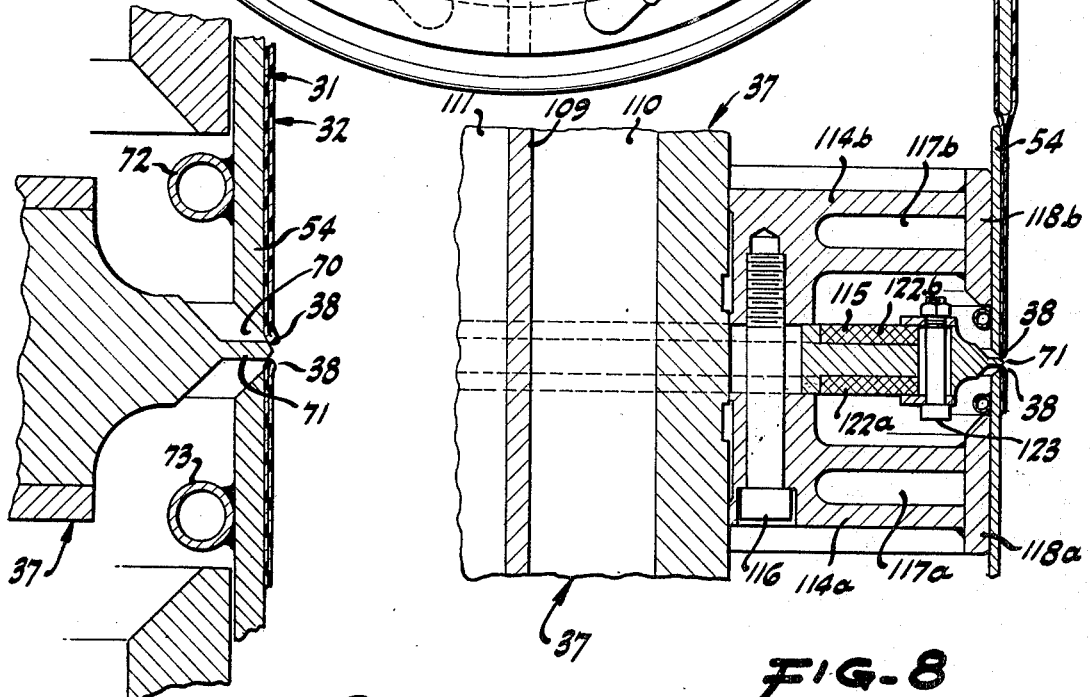

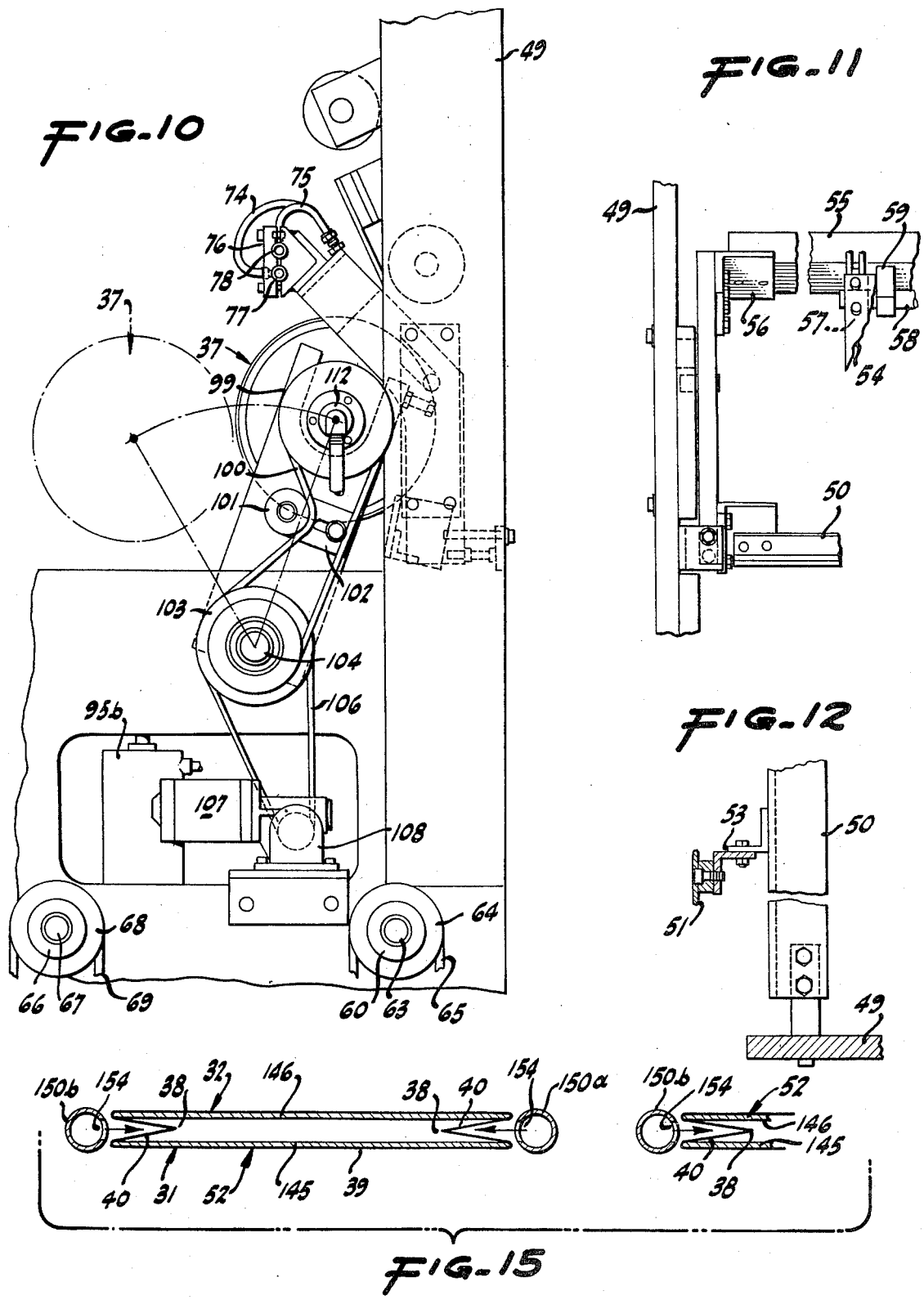

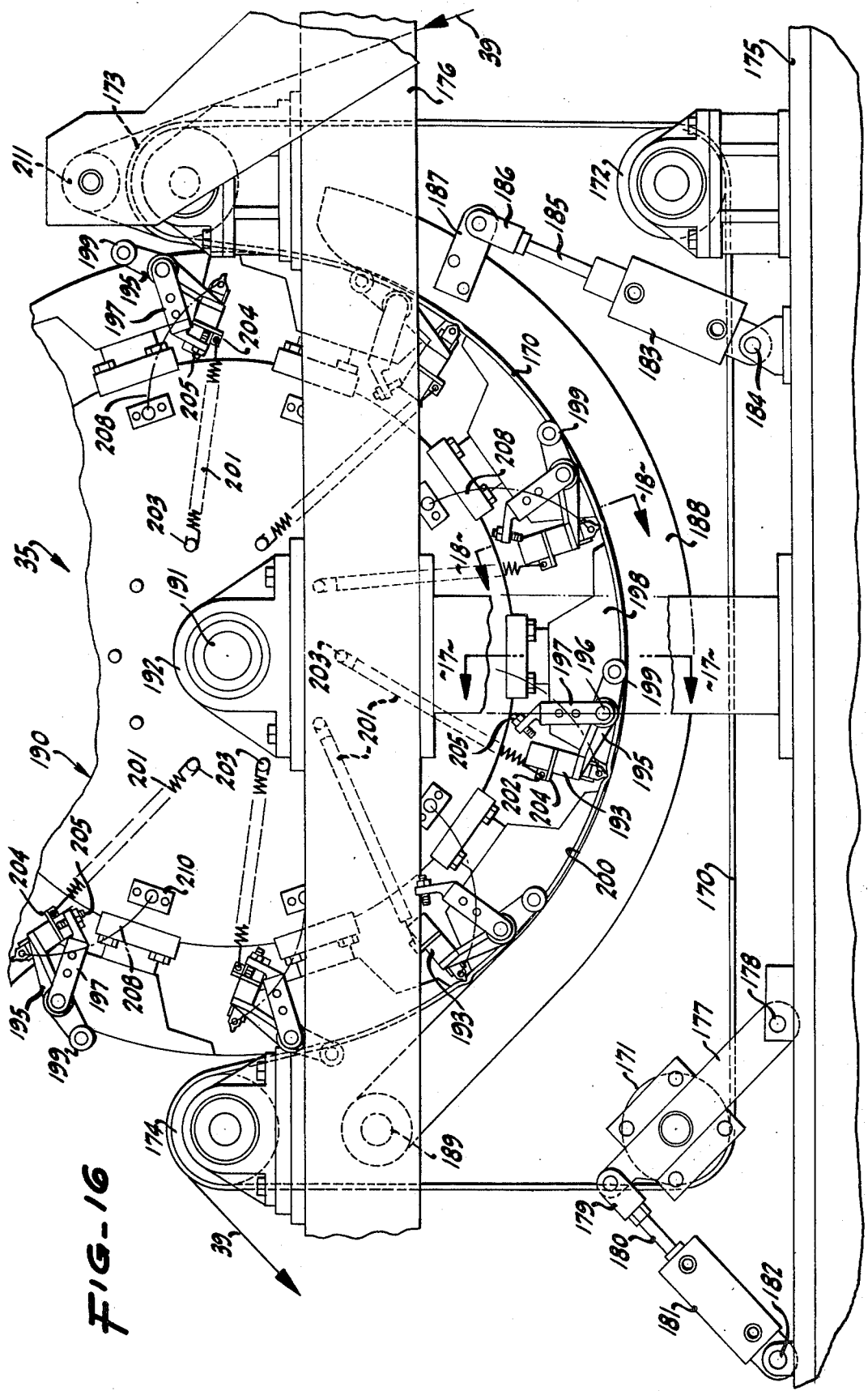

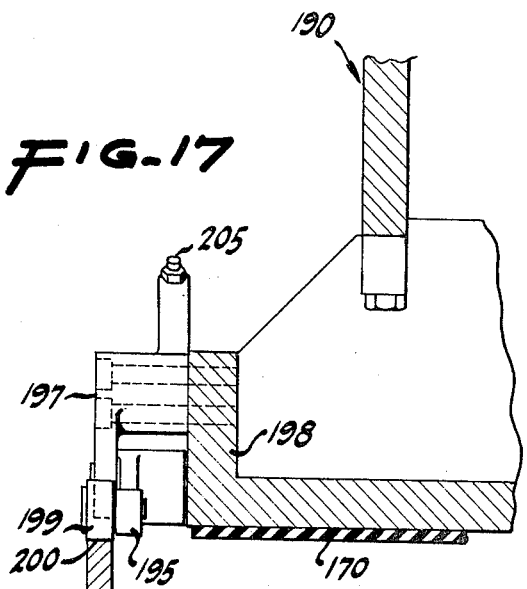
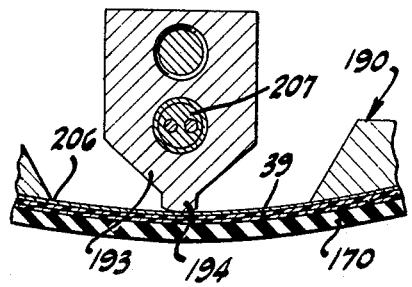
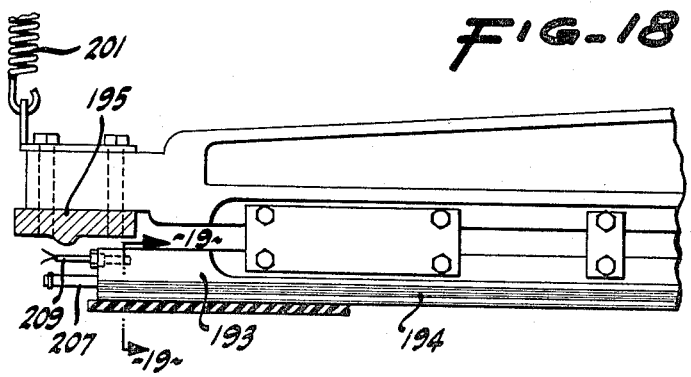
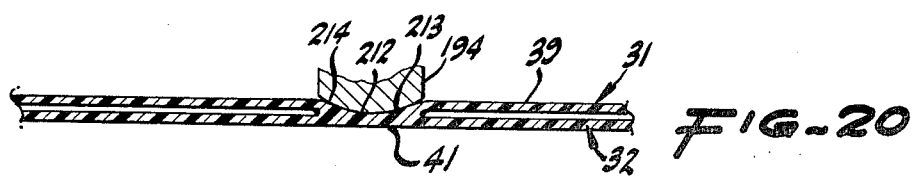
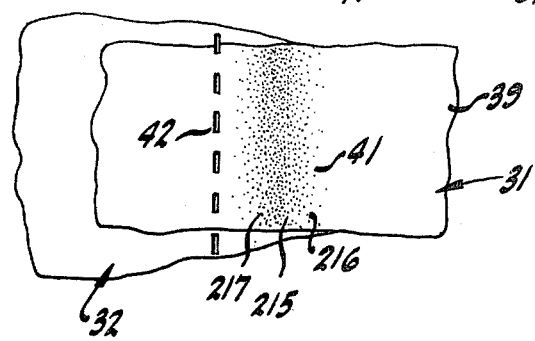

United States Patent Office 3,509,799
Patented May 5, 1970

3,509,799
BAG-FORMING METHOD
Rudolf R. Weis and Ellsworth A. Hartbauer, Antioch, Calif., assignors to Crown Zellerbach Corporation, San Francisco, Calif., a corporation of Nevada
Filed Aug. 4, 1967, Ser. No. 658,517
Int. Cl. B31b 1/14, 49/04; B31d 5/04
U.S. Cl. 93—35                                        4 Claims

ABSTRACT OF THE DISCLOSURE

Machine for and method of making gusseted bags from heat-sealable materials such as polyethylene. In practicing such method, a pair of wide webs are withdrawn from parent rolls thereof and advanced in contiguous juxtaposition through a succession of stations in which the webs first are continuously severed longitudinally at a plurality of transversely-spaced locations therealong and at the same time the two webs are joined along such severed edges to form a plurality of bag tubes. Next, each of the tubes along its joined longitudinal edge portions is deformed inwardly to provide pleats or folds which define gussets in the completed bags. Thereafter, the tubes are sealed transversely at longitudinally-spaced locations to form bottom closures for the bags; and finally, the tubes are perforated transversely adjacent such bottom closures to provide lines of separation enabling each of the tubes to be separated into a plurality of successive bags.

The machine provides web-slitting and sealing mechanism, gusset-forming mechanism, bottom-sealing mechanism, and bag-separating mechanism respectively operative to perform the functions of slit-sealing the contiguous webs longitudinally by application of heat thereto, forming gusset-defining folds along the sealed longitudinal-edge portions of the tubes by air impingement thereagainst, sealing the tubes transversely by application of heat thereto, and finally of providing lines of severance across the tubes to enable the same to be separated into a succession of bags.

---

This invention relates to a bag-forming machine and method and, more particularly, to a machine for and method of forming bags from heat-sealable materials such as polyethylene.

Bags formed of various materials are used extensively as containers for a great variety of products, typical of which are grocery and produce products. Although self-opening paper bags are most commonly used as containers for groceries, as respects fruit and produce, bags formed of plastic materials have advantages, and, accordingly, are often used as containers therefor. It may be said, then, that bags made of plastic materials are now known and in this respect, bags formed of heat-sealable materials, such as the synthetic thermoplastic known as polyethylene, have been and are being used in considerable numbers. To a great extent, the fabrication techniques employed to form bags from such heat-sealable materials involve the use of a single web of material folded upon itself to bring the two longitudinal edge portions thereof into contiguous overlying juxtaposition and heat is then applied to such overlying edge portions to seal the same together. Thereafter, the continuous tube thusly formed is sealed transversely at spaced-apart locations therealong to form a bottom closure for each bag, and the tube is then severed adjacent the bottom seals to divide the tube successively into a plurality of bags.

The present invention constitutes a departure from such prior bag-forming procedures and has among its objects, simultaneously forming a plurality of bags from relatively wide webs of heat-sealable material oriented with respect to each other in contiguous overlying juxtaposition. In forming such bags, the webs are concurrently slit and sealed along longitudinally extending lines transversely spaced from each other by the width of the bags to be formed. Such concurrent slitting and sealing of the webs is accomplished by proper application of heat thereto controlled to a value appropriate to slit or cut through the two webs and concurrently therewith to seal the two webs along each such line of severance. Thereafter, the longitudinal edge portions of the bag tubes which are thusly formed are deflected inwardly by impingement of air jets thereagainst to form folds or pleats therealong which define gussets in the completed bags. Next, the tubes, which are being advanced simultaneously in side-by-side parallel relation, are sealed transversely thereacross at longitudinally-spaced locations by application of heat thereto so as to form bottom closures for the individual bags and, following such transverse sealing, the tubes are provided with lines of severance, perforations for example, adjacent such transverse seals to enable each tube to be subdivided into successive lengths respectively defining bags.

The bottom closure for each bag has particular characteristics that make the same superior to bottom seals generally, and the provision of an improved bag of this type is another object of the present invention. As concerns further objects and advantages thereof, these will become apparent as the specification develops.

Embodiments of the invention are illustrated in the accompanying drawings in which:

FIG. 2 is a diagrammatic top plan view illustrating the successive steps performed on a pair of juxtaposed webs in making bags therefrom;

FIG. 3 is a diagrammatic perspective view illustrating the steps shown in FIG. 2 as they relate to the formation of one longitudinal succession or stream of bags separated from such webs;

FIG. 4 is a side view in elevation of the slit-seal and gusset-forming stations of the machine depicted diagrammatically in FIG. 1;

FIG. 5 is an enlarged broken front view in elevation, looking generally from right to left as the apparatus is viewed in FIG. 4, showing both the slit-seal and gusset-forming stations of the apparatus;

FIG. 6 is a broken front view in elevation, looking generally from right to left as the apparatus is viewed in FIG. 4, showing the slit-seal mechanisms of the machine;

FIG. 7 is an enlarged vertical sectional view taken along the line 7—7 of FIG. 6;

FIG. 8 is a broken horizontal sectional view taken along the line 8—8 of FIG. 7;

FIG. 9 is a further enlarged broken horizontal sectional view of the slit-seal blade as it is shown in FIG. 8;

FIG. 10 is a broken side view in elevation of the slit-seal mechanism illustrating in particular the drive for rotating the cutting and sealing blade structure, the view being generally similar to that of FIG. 4;

FIG. 11 is a broken front view of a portion of the apparatus shown in FIG. 10, the view being taken generally looking from left to right in FIG. 10;

FIG. 12 is a broken transverse sectional view taken generally along the plane 12—12 of FIG. 4;

FIGURE 13 is a partially diagrammatic and schematic view illustrating the circuit interconnections of the heating elements for the various web-slitting and sealing mechanisms;

FIG. 14 is an enlarged side view in elevation of a portion of the gusset-forming mechanism;

3

Figure 22:
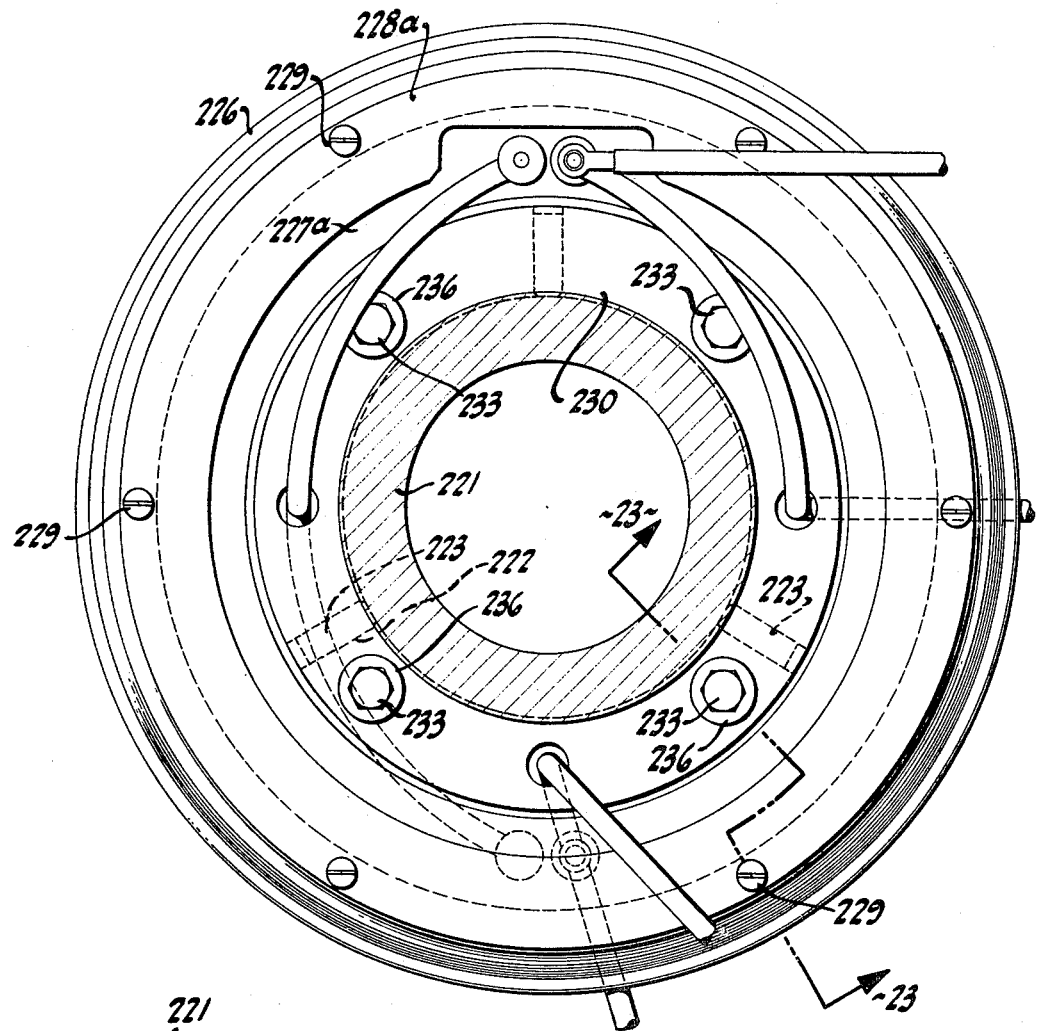
Figure 23:
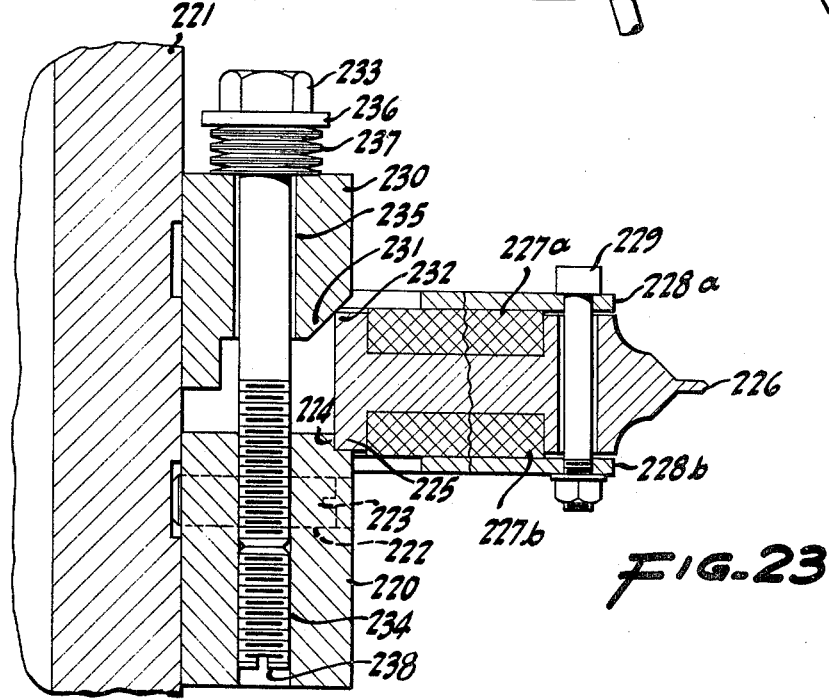

FIG. 15 is a broken horizontal sectional view taken along the line 15—15 of FIG. 14;

FIG. 16 is an enlarged broken side view in elevation of the bottom sealing drum;

FIG. 17 is an enlarged broken vertical sectional view illustrating the cam structure for actuating the bottom sealing elements, the view being taken along the line 17—17 of FIG. 16;

FIG. 18 is an enlarged broken transverse sectional view illustrating details of the bottom sealing element, the view being taken along the line 18—18 of FIG. 16;

FIG. 19 is an enlarged vertical sectional view showing the bottom sealing element in engagement with the bag-forming webs, the view being taken along the line 19—19 of FIG. 18;

FIG. 20 is an enlarged detail view essentially constituting a longitudinal sectional view through the bag-forming webs to illustrate the step of forming the bottom seal therefor;

FIG. 21 is a broken top plan view of a pair of successive bags showing, in particular, the bottom seal formed along one such bag;

FIG. 22 is a vertical sectional view, generally similar to that of FIG. 7, but illustrating a modified web-slitting and sealing mechanism; and FIG. 23 is a broken transverse sectional view of such modified mechanism taken along the line 23—23 of FIG. 22.

GENERAL DESCRIPTION

As indicated hereinbefore, the present invention is concerned with forming simultaneously a plurality of bags from wide webs of flexible, heat-sealable material. As a particular example of such material, the synthetic thermoplastic known as polyethylene has proven to be quite satisfactory, and in this reference it may be noted that polyethylene bags of the general type being considered herein have been made and used in the past. The particular bag product produced by the method and machine described herein is new, however, especially as respects the bottom seal thereof; and both the method by which such bag product is formed and the particular machine disclosed herein for making the same are also new.

Figure 1:
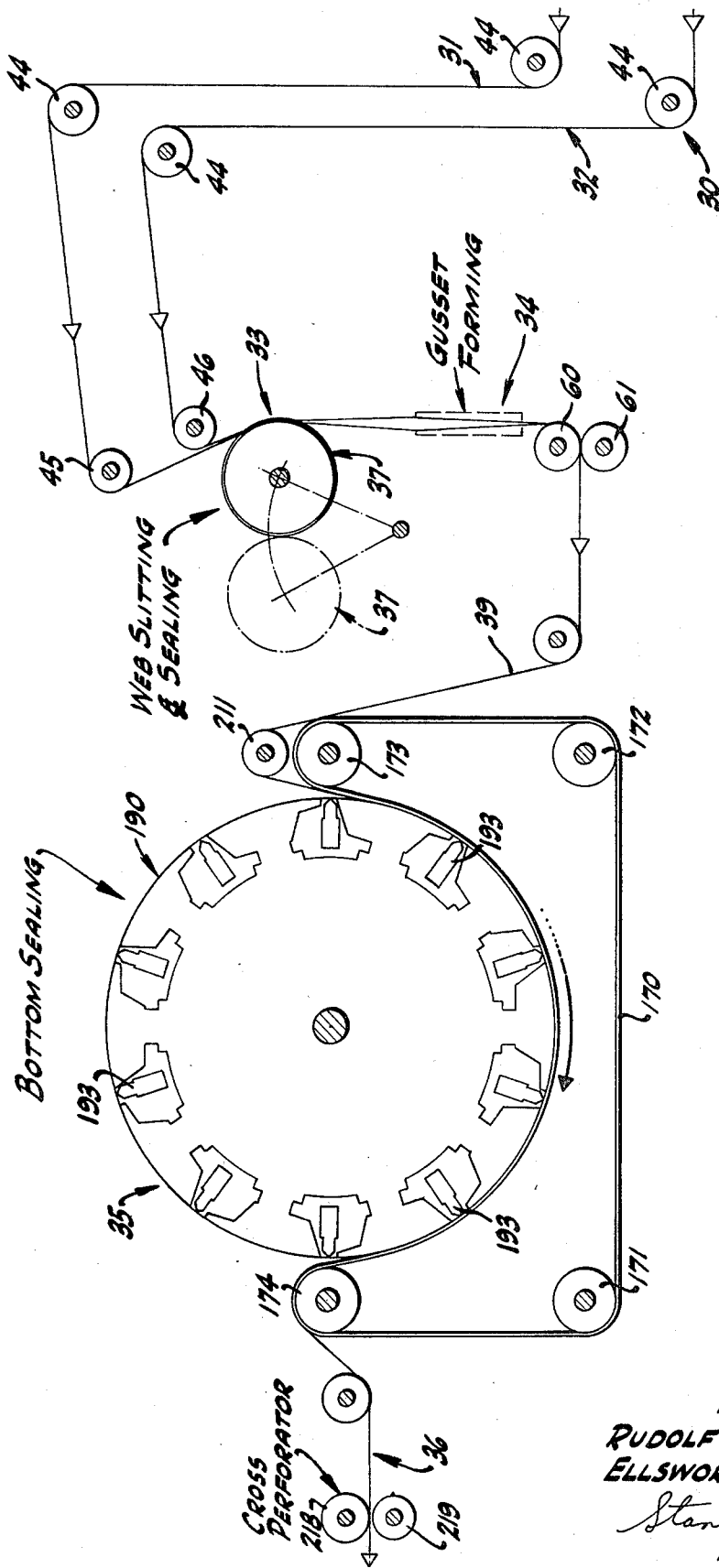
FIG. 1 is essentially a diagrammatic view illustrating the several stations in a bag-forming machine embodying the invention.

Referring to FIG. 1 in particular, it may be noted that the bag-forming machine embodying the present invention includes a back-stand mechanism 30 from which is supplied a pair of webs 31 and 32 that are withdrawn from parent or supply rolls thereof, not shown. The webs 31 and 32 traverse essentially parallel paths and are brought in substantially contiguous overlying juxtaposition at a sealing and slitting station 33 whereat the two webs 31 and 32 are both severed longitudinally and sealed to each other along each such line of severance by appropriate application of heat thereto. The longitudinally severed and sealed webs establish a plurality of individual bag tubes which pass downwardly from the station 33 through a gusset-forming station 34 at which such sealed edges are deformed inwardly to provide folds or pleats that define gussets in the completed bags. Thereafter the gusset-equipped, longitudinally sealed and severed webs 31 and 32 are advanced through a bottom-sealing station 35 at which the webs are heat sealed transversely at spaced-apart locations therealong to form bottom closures for the individual bags. Next, the webs are advanced through a bag-separating station 36 at which the webs are provided with transverse lines of severance, such as perforations, generally adjacent the bottom closures to enable the webs to be separated into a plurality of successive bags.

The various procedures described are illustrated in FIGS. 2 and 3 with reference to the changes effected in the webs 31 and 32, each of which figures shows the webs being advanced in the direction of the arrows. As the webs move through the sealing and slitting station 33, a plurality of web-slitting and sealing mechanisms 37 pro-

4 vided thereat sever or slit the webs along transversely spaced, longitudinally extending lines 38. Concurrently with the formation of the longitudinal lines of severance 38, the webs are joined one to the other along such lines so that after passing through the station 33, the juxtaposed webs 31 and 32 are divided into a plurality of individual bag tubes 39. As is well known in the bag-making art, bag tubes are essentially continuous and are circumferentially intact, which circumference as respects the tubes 39 encompasses the longitudinal seam lines 38 associated therewith.

At the gusset-forming station 34, the edge portions of each tube 39 are deflected inwardly by air jets, as will be described hereinafter, to form the gussets 40; and upon leaving the station 34, the gusset-equipped tubes 39 are advanced through the bottom sealing station 35 at which each tube is heat sealed transversely at longitudinally-spaced locations therealong to form the bottom seals 41. Thereafter, the tubes are provided with transverse lines of severance which enable each tube to be subdivided into a plurality of individual bags. In the particular embodiment being considered herein, the lines of severance are in the form of perforations 42 located generally adjacent the bottom seals 41. Evidently, the tubes 39 when subdivided along the various lines of perforation 42 form individual bags designated for identification with the numeral 43. Each such bag is open at its top (the top being defined by the lines of perforation 42), is closed at its bottom by the seal 41, and has gussets 40 along the longitudinal edge portions thereof.

BAG-FORMING MACHINE

As respects the bag-forming machine being considered herein, the back-stand 30 thereof may be of any particular type so long as it provides facility for rotatably supporting a pair of parent or supply rolls from which the webs 31 and 32 are withdrawn. Additionally, the back-stand includes a sufficient plurality of intermediate rollers 44, as shown in FIG. 1, to support the webs 31 and 32 as they are advanced toward the sealing and slitting station 33 and to assure such webs being disposed in contiguous juxtaposition upon entering such station 33.

WEB-SLITTING AND SEALING MECHANISM

Concerning such juxtaposition of the webs, the entrance or infeed into the station 33 is provided by a pair of rollers 45 and 46 which are respectively engaged by the webs 31 and 32 and are disposed in vertically spaced and longitudinally offset relation so as to enable the two webs to enter the station 33 in substantially parallel, contiguous juxtaposition. These two rollers 45 and 46 are idler rollers and are respectively journalled for rotation at the opposite ends thereof in brackets 47 and 48 bolted or otherwise rigidly secured to upwardly extending frame elements 49 of the machine, one such frame element together with one set of brackets 47 and 48 being illustrated in FIG. 4.

Also extending between the frame elements 49 is a L-shaped channel 50 that is bolted or otherwise affixed to the frame elements so as to be rigidly related thereto. Extending downwardly from the channel 50, which serves as a support therefor, are a plurality of transversely-spaced tongues 51 (see FIG. 5) that at their lower ends are respectively equipped with gusset-forming guides 52 which will be described in detail hereinafter. The tongues 51 may be secured to the support channel 50 in any appropriate manner, as by means of the brackets 53 shown in FIG. 12., which brackets are sectioned or formed in two parts that are bolted together to enable the precise position of each tongue to be adjustably selected. In this relation, the webs 31 and 32 are respecively disposed along opposite sides of the tongues 51 and the tongues are provided with an arcuate curvature corresponding in part to the general curvature of the web-slitting mechanisms 37.

Extending generally along the tongues 51 adjacent each of the web-slitting and sealing mechanisms 37 is a transversely disposed plate or shoe 54 affixed adjacent its upper end to a transversely extending support channel 55 that, as shown in FIG. 11, is secured to the frame elements 49 by means of support structure generally denoted 56. In terms of structural relationships, the plate or shoe 54 is secured at spaced-apart locations therealong to split clamps 57 which are mounted upon a rod 58 that is connected to the support channel 55 via hangers 59. Evidently, the angular disposition of the shoe 54 can be changed by loosening the clamps 57 to angularly displace the same about the shaft 58. When the appropriate location for the shoe 54 is attained, the clamps 57 are tightened upon the shaft 58 to positively locate the shoe along its upper edge.

As is perhaps most apparent in FIG. 4, the webs 31 and 32 pass downwardly from the rollers 45 and 46 along the opposite sides of the tongues 51 and guides 52 carried thereby which guides, in being interposed between the two webs 31 and 32, are used in forming the gusset-defining folds 40, as will be described hereinafter. The webs 31 and 32 also move downwardly over the arcuate shoe 54 with the web 31 being in actual engagement with at least a portion of the surface thereof. More particularly in this respect, the webs 31 and 32 are drawn firmly against the shoe 54 and the slight tension thus imparted to the webs is useful in slit-sealing the same. As shown in FIG. 4, the webs 31 and 32 are drawn or tensioned along the shoe 54 between the aforementioned rollers 45 and 46, which respectively engage the webs 31 and 32, and the pinch or nip rollers 60 and 61 between which the two webs, or more accurately the bag tubes formed therefrom, are gripped.

The rollers 60 and 61 are appropriately journalled for rotation in bearing components carried by frame members of the machine, such as the frame plate 62 shown in FIG. 4. The roller 60 is a driven element and, as shown in FIG. 10, it is mounted upon a shaft 63 equipped with a sheave or pulley 64 about which is entrained a drive belt 65. The drive belt is energized from the main drive, not shown, of the machine as are all of the rollers associated with advancing the webs 31 and 32 from the infeed end of the machine to the discharge end thereof. Similarly, the roller 66 (FIG. 4) which follows the rollers 60 and 61 is mounted upon a shaft 67 which is equipped with a sheave or pulley wheel 68 about which is entrained a drive pulley 69 driven by the same main drive of the machine.

As shown best in FIGS. 5 and 7 through 9, the shoe 54 is provided with a plurality of narrow, longitudinally extending slots 70 at transversely-spaced locations therealong which slots are respectively aligned with slit-sealing blades 71 respectively provided by the web-slitting and sealing mechanisms 37. In the operative position of the mechanisms 37, the slit-sealing blades 71 thereof project through the respectively aligned slots 70 so as to engage the webs 31 and 32 advanced therealong, as shown in FIGS. 8 and 9 in particular. It may be observed in FIG. 9 that the shoe 54 on the back side thereof (i.e., the side opposite the webs 31 and 32) is relieved slightly along each slot 70 so as to provide a generally V-shaped channel terminating in the slot. Since the blades 71 are heated components, the shoe 54 tends to assume the temperature of the blades particularly after long periods of operation of the machine, and since elevated temperatures are incompatible with the thermoplastic webs 31 and 32, provision is made to cool the shoe 54 at least to a temperature sufficiently low to maintain it below the softening temperatures of the webs 31 and 32.

As shown in FIGS. 5, 9 and 10, the plate 54 is equipped with flow conduits or tubes 72 and 73 along each slot 70, and such tubes are joined at their lower ends into a U-shaped configuration defining a continuous flow passage along the associated slot. At their upper ends the tubes 72 and 73 are connected via extensions or connector conduits 74 and 75 to manifold structure 76 that includes supply and discharge pipes 77 and 78. The supply pipe 77 is connected to a suitable source of cooling fluid, such as tap water, and the water flows through the supply tube 77, into each of the tubes 72 through the extensions 74 connected therewith, and outwardly through the tubes 73, extensions 75 and discharge pipe 78. Thermostatic controls may be employed to regulate the flow of cooling fluid although in most instances such control is not essential and a manually adjustable valve for metering the flow is sufficient.

The shoe 54 is anchored along the lower edge thereof to a L-shaped channel 79 extending between the frame elements 49 and secured thereto. As shown in FIG. 4 and 5, the shoe 54 may be adjustably secured to the channel 79 so as to permit slight selective positioning of the shoe along its lower edge and for this purpose, the channel 79 may be provided with a plurality of upwardly extending ears 80 bolted or otherwise fixedly secured to the channel and which respectively carry threaded studs 81 that project through openings provided therefor in the plate 54. The location of the plate along such studs is fixedly determined by lock nuts, as illustrated.

The web-slitting and sealing mechanisms 37 are pivotally movable between a forward operative position, shown by full lines in FIG. 4 and 10, and a rearward inoperative position illustrated by broken lines in such figures. In order to enable movement of the mechanisms 37 between such active and inactive positions thereof, the entire assembly is supported by a transversely-extending beam 82 which adjacent the opposite ends thereof is equipped with connector flanges 83 and 84 that are bolted respectively to carriers 85 and 86. The carriers are supported for angular displacements about a transverse axis defined by a pair of pivot shafts 87 and 88 which are fixedly secured to the outer frame plate 62. Accordingly, the beam 82 is angularly displaceable about the axes of the shafts 87 and 88 to carry the web-slitting and sealing mechanisms 37 between the forward active and rear inactive positions thereof.

In order to effect such movement, the beam 82 is equipped adjacent the opposite ends thereof with rearwardly projecting lugs 89 and 90 to which are pivotally secured, respectively, the bifurcated end portions 91 and 92 and a pair of push rods 93 and 94. As shown in FIGS. 4 and 10, the push rods are respectively associated with motor means in the form of piston-cylinder structure which, as respects the push rod 93, constitutes a cylinder 95a pivotally anchored at its lower end to the adjacent outer frame plate 62 of the machine and which is provided with a reciprocable piston to which the rod 93 is affixed. In the relative position of the component shown in FIG. 4, the motor means has been energized so as to displace the rod 93 forwardly whereupon the beam 82 has been angularly displaced in a clockwise direction so as to position the web-slitting and sealing mechanisms 37 in the active positions thereof. Energization of the motor means in the opposite direction will displace the rod 93 downwardly whereupon the beam 82 will be displaced in a counterclockwise direction to move the mechanisms 37 into their inactive positions. As indicated in FIG. 10, the push rod 94 is similarly associated with a motor means 95b and, in each instance, the motor means are fluid actuated as, for example, by means of compressed air.

As seen most clearly in FIG. 6, the carriers 85 and 86 are equipped adjacent their upper ends with bearing structures 96 and 97 in which is journalled a shaft 98 that extends outwardly beyond the carriers. Adjacent the carrier 86, the shaft 98 is equipped with a pulley wheel or sheave 99 about which a drive belt 100 is entrained. The belt 100 passes over a take-up roller 101 carried by a bracket 102 secured to the carrier 86. The belt 100 is also entrained about a drive pulley 103 mounted upon a shaft 104 so as to rotate therewith, and such shaft is equipped with a pulley 105 that has a drive belt 106 entrained thereabout which is driven by a motor 107 via a gear reducer 108. For reasons that will be explained hereinafter, the motor 107 operates continuously to impart uninterrupted motion to the shaft 98 irrespective of whether the web-slitting and sealing mechanisms 37 are in the active or inactive positions thereof.

The shaft 98 is enlarged throughout the center portion 98' thereof, as shown in FIGS. 5 and 7, and is hollow thereat to define a large central passageway therethrough divided axially by a center baffle 109 to form a supply passage or manifold 110 and an exhaust or return passage or manifold 111. As shown in FIGURE 6, cooling fluid, tap water for example, is supplied to the manifold 110 from a suitable source, not shown, by means of a connector 112 which is in flow communication with the manifold 110 via a passage 110' (see FIG. 5) in the left-hand portion of the shaft 98 as it is viewed in FIGS. 5 and 6. In an analogous manner, cooling fluid is removed from the exhaust manifold 111 by a connector 113 via the passageway 111' (FIG. 7) in the right hand end portion of the shaft 98. Since the shaft 98 rotates, it is evident that the connections defined by the connectors 112 and 113 must permit rotation of the shaft while forming a substantially liquid-tight seal therewith.

As shown in FIGS. 6 and 7, each of the web-slitting and sealing mechanisms 37 is a cylindrical drum comprised essentially of three components (see FIG. 8) symmetrically disposed about a center line effectively defined by slit-sealing blade 71. For convenience of description, such components are denoted with the numerals 114a and 114b as concerns the two outer components, and 115 as concerns the inner component sandwiched between the outer components. These three components are secured together at angularly-spaced locations thereabout by a plurality of cap screws 116. Each of the components 114 is provided with a hollow-annular passage or chamber 117 adjacent the outer cylinder edge portion thereof, which annular chamber is adapted to have cooling fluid flow therethrough from the supply manifold 110 and to the return manifold 111. Each such chamber 117 is closed along the outer edges thereof by a cylindrical flange or rim 118 welded or otherwise secured to the inner web portions of the associated component. The cylindrical flanges 118 may substantially engage the rear surface of the plate 54 during operation of the machine, as shown in FIG. 8, and evidently then, the plate 54 along any such area of engagement thereof with the rim flanges should have an arcuate configuration conforming essentially to the circumferential curvature thereof.

Each of the cooling chambers 117 is connected to the supply manifold 110 by a connector conduit 119 and is similarly connected to the return manifold 111 by conduit 120. It will be apparent from inspection of FIG. 7 that the conduits 119 and 120 are connected to the annular chambers 117 in close proximity therealong (although their points of connection with the manifolds 110 and 111 are diametrically spaced), and for the purpose of enforcing a flow of cooling liquid through the chamber, a baffle 121 is mounted therein so as to effectively divide the chamber and thereby separate the conduits 119 and 120 thereat. Accordingly, and again referring to FIG. 7, cooling fluid will flow from the connector 112 into the manifold 110 and outwardly therefrom through the various conduits 119 and into the respective chambers 117. The cooling fluid flows completely through each chamber 117, in a counterclockwise direction as viewed in FIG. 7, from the general area of the baffle 121 on one side thereof to the general area of such baffle on its opposite side whereat the fluid is directed via the conduit 120 into the return manifold 111 and thence to discharge through the connector 113.

It will be apparent that each of the mechanisms 37 is provided with cooling chambers 117a and 117b so as to maintain the annular flanges 118 thereof in a relatively cool condition by removing heat that tends to accumulate thereat as a consequence of the blade 71 being heated. Respecting the two outermost mechanisms, the outer chambers thereof (117a in one case and 117b in the other) are connected to the manifolds 110 and 111 via flow passages in the solid end portions of the shaft 98, as shown in FIG. 5. As in the case of the cooling liquid supplied to the tubes 72 and 73 of the plate 54, thermostatic controls may be employed to regulate the flow of cooling liquid through the shaft 98 and through the chambers 117 of the various web-slitting and sealing mechanisms 37.

From what has been said heretofore it is clear that the blades 71 are heated to a temperature adequate to sever the webs 31 and 32 and also appropriate to effect joinder of the webs along each line of severance; and in the present machine, the blades are heated electrically. Referring to FIG. 8 it is seen that the inner component 115 of each web-slitting and sealing mechanism 37 is in the general form of a continuous annular ring terminating along the outer circumferential edge thereof in the blade 71. Such ring has an annular channel cut along each surface thereof in which are seated annular heating elements 122a and 122b held in position by a plurality of bolts 123 which, in this respect, cooperate with holder or clamp components that overlie the heating elements, as shown in FIG. 8. The heating elements 122 may be conventional electrical resistance elements imbedded in insulating material, which may be ceramic, so as to electrically isolate the metallic structure of the component 115 from the electrical current used to elevate its temperature.

As respects the electrical interconnection of the various heating elements 122 with the power source therefor, it is apparent that a variety of circuit arrangements might be employed but in the particular machine being considered herein the two elements 122a and 122b comprised in any one web-slitting and sealing mechanism 37 are connected in series and the several series-connected elements of the mechanisms 37 are arranged in parallel. Such circuitry is illustrated in FIG. 13 which diagrammatically depicts the heating elements 122a and 122b for each of a pair of adjacent web-slitting and sealing mechanisms 37 and the interconnection of such elements with the supply lines. Considering one such mechanism 37, the heating elements 122a and 122b thereof are connected in series by a jumper 124 and are connected across the power supply lines 125 and 126. In this respect, the free end of the element 122a is connected to the supply conductor 125 and the free end of the element 122b is connected to the power conductor 126. Such interconnection is repeated for the heating elements of each of the mechanisms 37, wherefore, the various series-connected heating elements of all such mechanisms are arranged in shunt connection.

The power or supply conductors 125 and 126 extend along the shaft 98 and through the various mechanisms 37, as indicated in FIG. 7 which depicts the conductors 125 and 126 as being enclosed within a suitable insulating material and as extending through openings or passages provided therefor through the mechanisms. In that the shaft 98 rotates, a slip connection leading to the conductors 125 and 126 must be made and such connection thereof is illustrated in FIG. 6. In this view the two end portions of the conductor 125 are shown, and such end portions thereof are connected electrically to the respective rings 127 and 128 which rotate with the shaft 98 and to which rings electrical connection is established by means of spring-biased brushes 129 and 130. In a similar manner, the conductor 126 (not shown in FIG. 6) is connected at its opposite ends to slip rings 131 and 132 which are respectively engaged by spring-biased brushes 133 and 134. Evidently, the brushes are connected in an appropriate electrical circuit selected in accordance with the characteristics of the heating elements 122 so as to appropriately heat the same. As shown in FIGS. 6 and 7, the circuit and machinery generally may be grounded by means of the conductor 135 (FIG. 7) which is connected externally via a slip 136 and spring-biased brush structure 137.

A well-regulated control over the temperature of the slit-sealing blades 71 is advantageously incorporated into the machine, and a control mechanism found to be satisfactory is illustrated in FIGS. 4 and 6. Such control mechanism is essentially conventional and takes the form of a sensor 138 carried by arm structure 139 supported for angular displacements about a pivot pin 140 provided by a block 141 which is carried by a plate or bracket 142 bolted or otherwise fixedly secured to the beam 82. The sensor 138 is resiliently biased into engagement with the blade 71 by a helical spring 143 which extends between connectors therefor respectively carried by the arm structure 139 and bracket 142. The sensor 138 is provided with a slot 144 dimensioned to receive the blade 71 therein which results in a relatively large surface area effective for heat transmission between the sensor and blade so as to enable accurate sensing of the contemporaneous temperatures of the blade 71.

Quite evidently the temperature at which the cutting blades 71 should be maintained will depend upon the temperature characteristics of the material used to provide the webs 31 and 32 from which the bags 43 are made. In the case of the material being polyethylene, temperatures within the range of about 650° F. to 750° F. are appropriate, and as a specific example, a temperature of approximately 750° F. has been found to be satisfactory with a rate of movement of the webs approximately 400 feet per minute. It has also been found satisfactory to control generally the energizing circuit for each of the various heating elements 122 in response ot the temperature sensed at only one of the blades 71, as indicated in FIG. 6; and the temperature sensed at such one blade is used in the ordinary manner as a thermostatic control regulating the flow of current through the aforementioned supply conductors 125 and 126. Since such control arrangements are well known and because the one employed herein is commercially available, it is not further illustrated in the drawings and additional description thereof appears unnecessary.

GUSSET-FORMING MECHANISM

As explained hereinbefore with particular reference to FIGS. 1, 2 and 3, the webs 31 and 32 upon leaving the web-slitting and sealing station 33 are in the form of bag tubes 39 each of which is circumferentially intact or continuous in being heat sealed along each of the lines of severance 38 dividing the webs 31 and 32 into bag tube widths. The individual bag tubes 39 move downwardly from the web-slitting and sealing station 33 toward the gusset-forming station 34 at which the folds or pleats 40 are formed along each sealed edge so as to form gussets in the completed bag. As previously explained, the webs 31 and 32 as they move through the stations 33 and 34 are located along opposite sides of the tongues 51 and, therefore, are also located along the opposite sides of the gusset-forming guides 52 respectively carried by such tongues.

As is most evident in FIGS. 5 and 15, each of the guides 52 comprises a pair of generally rectangular plates 145 and 146 respectively disposed on opposite sides of the associated tongue 51 and are fixedly secured thereto by a plurality of screws 147. The plates 145 and 146 are substantially wider than the tongue 51 and are secured thereto through spacers 148 and 149 interposed between the tongue 51 and the respective plates 145 and 146. The spacers 148 and 149 have different thicknesses, as shown in FIGS. 4 and 14, and the thicker spacer 148 is located adjacent the upper ends of the plates. As a consequence thereof, the plates are angularly disposed and converge downwardly and inwardly to provide a generally V-shaped configuration although at their lower extremities the plates are spaced apart so as to enable the pleated webs 31 and 32 to pass therebetween. The outer faces of the plates 145 and 146 are necessarily smooth and are substantially free of any obstruction which might tear or otherwise damage the webs passing thereover and, accordingly, the heads of the screws 147 are essentially flush with the surfaces of the plates.

As seen in FIG. 5, adjacent guides 52 are spaced apart transversely and interposed therebetween are web deflectors in the form of nozzle-equipped tubes 150a and 150b. Each of the tubes 150 is closed at its upper end as by means of a plug 150', shown in FIG. 14, and is turned laterally adjacent its upper end portion so as to project forwardly beyond the plate 145 of the guide 52. Each tube 150 also extends downwardly along the associated plates 145 and 146 in symmetrical relation therewith so as to be aligned essentially with the opening or space defined between the plates. At its lower end, each tube 150 is turned forwardly and is connected by a coupling 151 to a supply manifold 152 through which air under pressure is continuously delivered to the tube. The manifold 152 is fixedly secured to the frame plates 62 of the machine as through mounting clamps 153. Although the particular supply pressure employed will depend somewhat upon the characteristics of the web material to be pleated, as a specific example a pressure source supplying compressed air at a rate of about 280 cubic feet per minute and at a pressure of approximately 2 p.s.i.g. has been found satisfactory in a machine processing polyethylene film and having twelve individual tubes 150 arranged as shown in FIG. 5.

Each tube 150 is provided with nozzle structure through which air is directed inwardly toward the interior of the space defined between the facing pair of plates 145 and 146, as illustrated in FIG. 15. In the structure shown, the nozzles take the form of apertures 154 formed in the tubes and, as shown in FIG. 14, two such apertures 154 are provided in each tube adjacent the lower ends of the plates 145 and 146. Evidently, the apertures 154 direct the compressed air discharged therethrough against the seamed edge portions of the webs 31 and 32 and deflect such edge portions inwardly betwen the plates 145 and 146 and together therewith, form the aforementioned gusset-defining folds or pleats in the bag tubes 39. Each pair of tubes 150a and 150b adjacent the upper forwardly turned ends thereof are secured to a hanger 155 which is fixed at its upper end to a transversely extending mounted bar 156. Adjacent its lower end, each tube 150 has a connector web 157 affixed thereto and a bracket structure, comprising a pair of arms 158 and 159, connected with the web 157 is bolted to a channel 159' secured to the frame plates 62. As shown in FIG. 5, the arm 159 is equipped with an elongated slot through which it is bolted to the channel 159' and such slot affords slight adjustment of the position of the associated tube 150 for alignment purposes.

As illustrated in FIG. 4, a web-presence sensor mechanism is interposed between the sealing and slitting station 33 and gusset-forming station 34, and the purpose thereof is to shut down the machine should breakage occur along the webs 31 or 32. It will be apparent that the webs when passing between such two stations are in the form of bag tubes 39, as explained heretofore and shown most particularly in FIG. 2, and, accordingly, it is most advantageous to sense the presence of each such tube 39. Although a variety of web-presence sensor mechanisms may be used in the machine being considered, the sensing mechanism employed includes a transversely extending rod or shaft 160 journalled for rotation in bearings 161 supported upon a channel 162 which extends between and is carried by the frame plates 62. Adjacent one end, the shaft 160 is equipped with a depending actuator 163 adapted to engage the arm of a switch 164 which is arranged in the power circuit of the machine and is adapted in one position to interrupt such power circuit.

Also secured to the shaft 160 is an arm or lever 165 to which is connected a helical spring 166 fastened to the channel 162. The spring 166 tends to bias the arm 165, shaft 160 and actuator 163 in a counterclockwise direction, as viewed in FIG. 4, thereby tending to withdraw the actuator 163 from the arm of the switch 164. Upon such withdrawal, the switch 164 becomes active to interrupt the power circuit of the machine. However, the shaft 160, actuator 163, and arm 165 are held in the position illustrated in FIG. 4 as long as the webs 31 and 32 pass downwardly between the upper rollers 45 and 46 and the lower nip rollers 60 and 61 because a plurality of feelers 167 secured to the shaft 160 so as to rotate therewith are adapted to engage the webs and are held thereby in the position illustrated in FIG. 4. Should the web break, one or more of the feelers 167 will be released by the discontinuance of the force applied thereto through the tensioned webs, whereupon the biasing force of the spring 166 will become dominant and will cause the shaft 160 to be displaced angularly in a counterclockwise direction to shift the condition of the switch 164 and thereby terminate operation of the machine by interrupting its power circuit.

BOTTOM-SEALING MECHANISM

In describing the bottom-sealing mechanism, reference will be made in particular to FIGS. 16 through 21 and, as explained heretofore with reference to FIGS. 2 and 3, such mechanism is operative to provide each of the bag tubes 39 at longitudinally-spaced locations therealong with transversely-disposed bottom seals 41 after the tubes have had the gusset-defining folds or pleats 40 formed therein at the gusset-forming station 34.

The bottom-sealing mechanism includes an endless belt 170 which is at least as wide as, and usually somewhat wider than, the webs 31 and 32 and it is entrained about a plurality of rollers respectively indicated by the numerals 171, 172, 173 and 174. The rollers 172, 173 and 174 are fixed against translational displacements, and in this respect the roller 172 is journalled for rotation at opposite ends thereof in bearing structures fixedly mounted upon horizontally-disposed platform components 175. In an analogous manner, the rollers 173 and 174 are each journalled for rotation adjacent the opposite ends thereof in bearing structures carried by longitudinally-extending frame members 176 disposed above and mounted upon the platform components 175.

The roller 171 is used to keep the belt 170 centered or tracking along a predetermined path, and at one end the roller 171 is journalled for rotation in an adjustable turnbuckle structure (not shown) and at its other end it is supported by a carrier member 177 mounted for angular displacements about a pivot-pin component 178 supported by the aforementioned platform components 175. The carrier member 177 is pivotally secured to the bifurcated end portion 179 of a rod 180 which is axially displaceable by a motor means 181 in the form of a fluid-actuated piston-cylinder structure, the piston of which is secured to the rod 180 and the cylinder of which is pivotally supported by a pin 182 mounted upon the platform 175. The motor means 181 is controlled by a switch sensor (not shown) determining the contemporary location of the belt 170, and the motor means is energized in response thereto to either extend or retract the rod 180 as necessary to maintain the belt in proper alignment. The roller 174 is driven by appropriate connection (not shown) with the main drive of the machine so as to positively drive the belt 170 when it is tensioned against the roller 174 by proper energization of the motor means 181.

It may be noted in FIG. 16 that a second motor means 183 in the form of a fluid-actuated piston-cylinder structure is included in the apparatus and the cylinder of such motor means is also carried for pivotal movement about a pin 184 supported by the platform 175. The piston of the motor means 183 is equipped with a rod 185 pivotally connected through a bifurcated end portion 186 to an ear or arm 187 riveted or otherwise fixedly secured to an elongated arcuate cam 188 supported adjacent its opposite end for pivotal movement about the axis of a shaft 189 extending between and supported by the frame members 176. The cam 188 is used in effecting the bottom seals 41, as will be described hereinafter, and it is selectively movable between the active position thereof shown in FIG. 16 and an inactive position in which it is moved downwardly in a clockwise direction with respect to the shaft 189 upon energization of the motor means 183 so as to retract the rod 185 thereof. As a consequence of the width of the belt 170 and associated components of the bottom-sealing mechanism, a cam 188 and motor means 183 therefor are provided along each side of the mechanism.

The frame members 176 are spaced apart transversely and rotatably receive therebetween a relatively large drum generally denoted with the numeral 190. The drum 190 is essentially cylindrical and cooperates with the convexly arcuate upper reach of belt 170 which provides a heat sealing supporting surface. The drum is equipped centrally with a shaft 191 extending therethrough that is journalled for rotation adjacent the opposite ends thereof in bearings 192 mounted upon the frame members 176. The circumference of the drum 190 approximates the aggregate lengths of a predetermined number of bags 43, and in this reference the drum is equipped with a plurality of bottom sealers 193 angularly spaced from each other by the length of a bag 43 (i.e., the distance between two successive transverse bottom seals 41).

Each of the bottom sealers 193 is supported for movement between a retracted position in which it is located within the drum 190 remote from the cylindrical surface thereof and an extended position in which the sealing blade or edge 194 of the sealer projects outwardly beyond the extremities of such cylindrical surface. In order to enable such movement of the bottom sealers 193, each such sealer is supported adjacent each end thereof by one end of an associated actuator arm 195 mounted intermediate the ends thereof for pivotal movement about a pin 196 carried by a bracket 197 secured to a mounting block 198. Adjacent its opposite end, each actuator arm 195 is equipped with a rotatable cam follower 199 adapted to ridingly engage the upper surface 200 of the associated cam 188.

As the drum 190 rotates in a clockwise direction, as viewed in FIG. 16, each cam follower 199 in turn is brought into engagement with the cam 188 whenever the cam is in its active position, and engagement with such cam displaces the cam follower 199 inwardly, whereupon the actuator arm 195 is angularly displaced in a counterclockwise direction, as viewed in FIG. 16, to displace the associated sealer 193 outwardly to the extent that the sealing edge or blade 194 thereof projects beyond the surface of the drum. The sealer 193 is maintained in such extended position thereof until the end of the cam 188 is reached, whereupon the cam follower 199 becomes disengaged from the cam and the sealer 193 is returned to its retracted position.

In order to positively return each bottom sealer 193 to its retracted position upon disengagement of the cam followers 199 associated therewith from the respective cams 188, a helical spring 201 is employed at each end of the sealer to resiliently bias the same toward its retracted position. Each spring 201 at one end is secured to an ear 202 carried by the associated bottom sealer 193 and at its other end the spring connected to a stud 203 provided by the superstructure of the drum 190. It will be noted that each bottom sealer 193 adjacent each end thereof is equipped with an abutment 204 adapted to engage an adjustable stop 205 carried by the bracket 197. Cooperative engagement of the abutment 204 with the associated stop 205 under the biasing force of the spring 201 determines the extreme inner position of the bottom sealer 193.

As is most evident in FIG. 19, the drum 190 provides a space or opening 206 extending transversely thereof adjacent each of the bottom sealers 193 and through which the bottom sealer is displaced to project the sealing blade or edge 194 thereof beyond the cylindrical surface of the drum. Also, as shown in FIG. 19, each of the bottom sealers 193 is provided with a heating element 207 extending along the length thereof within an elongated passage provided for its receipt. The heating element 207 is an electrical unit of standard design comprising a resistance heater suitably encased within an insulating material to electrically isolate the element from the metallic body of the sealer 193. Evidently, each heating element 207 is connected to an appropriate energizing circuit therefor, which connection is indicated in FIG. 16 by the broken lines 208. Each bottom sealer 193 is further provided with a temperature-sensing element 209, as shown in FIGS. 18 and 19, which is connected through a suitable thermostatic control 210 (FIG. 16) in the energizing circuit of the associated bottom sealer. Accordingly, each bottom sealer 193 is equipped with a heating element having in its energizing circuit a thermostatic control to maintain the temperature of the heating element at a temperature approximating a preselected value. Referring to the example heretofore used respecting the temperature of the slit-sealing blades 71, temperatures in the range of about 360° F. to 400° F. have been found to be satisfactory, and in a particular embodiment of the invention a temperature of 375° F. is maintained where the material being processed is polyethylene and where the rate of movement therefor approximates 400 feet per minute.

It has been found that the webs 31 and 32 should not be maintained under tension when the bottom seals 41 are formed therein because the webs are weakened if maintained under tension at the time that the seals are formed therein and tend to pull apart. Tension is relieved in the present machine by rotatable driving the pinch or draw rollers 60 and 61 (FIGS. 1 and 4) at an angular velocity such that the rate at which the webs are advanced to the bottom sealing drum 190 is somewhat greater than the rate at which the drum and belt 170 advance the webs. Accordingly, a slight bit of slack is provided along the stretch or length of web extending between the draw rollers 60 and 61 and the infeed to the bottom sealing station 35 as such infeed is defined by the roller 173 or, more specifically, by the roller 211 located thereabove. The drum 190, it should be noted, is driven from the main drive of the apparatus through a suitable drive train, not shown, connected with the shaft 191. Evidently, the rates of movement of the facing surfaces of the belt 170 and drum 190 are essentially coincident.

Also as concerns each bottom seal 41, it may be noted, as illustrated best in FIG. 20, that the sealing edge or blade 194 of each of the bottom sealers 193 has an arcuate configuration that is essentially symmetrical about a radial line drawn through the blade from the center of the drum 190. Thus, each blade is of greatest radial length at its center and retreats therefrom along generally arcuate paths to the longitudinal edge portions of the blade. For purposes of identification and again referring to FIG. 20, the center portion of greatest radial extent of each blade is denoted with the numeral 212 and the two arcuate surface areas retreating therefrom are respectively denoted 213 and 214. This blade configuration is of significance in forming a seal 41 having the features and characteristics which will now be described.

Referring to FIGS. 20 and 21, it will be observed that the bottom seal 41 is rather wide, and it extends in both directions from a center location 215 corresponding to the center portion 212 of the blade 194 through transitional sections 216 and 217 respectively corresponding to the surface areas 213 and 214 to the outer limits of the seal. Since the lines of separation or perforations 42 are located along one edge of the aforesaid seal 41, the transitional section 217 nearest such perforations is of lesser significance than the transitional section 216 as concerns the strength characteristics of the seal and will be neglected in describing the same.

It will be appreciated that the bottom seal 41 increases in degree of strength through the transitional section 216 thereof toward the center 215, which change in intensity or strength corresponds to the extent to which the webs 31 and 32 are bonded along their contiguous surfaces. More particularly in this respect, the bond defined between the webs 31 and 32 at the outer extremity of the transitional section 216 is rather limited and it progressively increases in extent to a maximum value along the central area 215. Such varying-intensity seal appears to have less tendency to tear or break than a seal of substantially uniform intensity, and in certain test cases the strength has increased in the order of 25%. It is postulated that such increase is attributable to a change in the location of the points of maximum stress on the bag and seal from the usual location thereof along the sharp edge of the conventional seal defining the terminus of the bag chamber to a location remote therefrom or, specifically, along the central section 215.

Further to this point, when the bag is filled with products, the location of maximum load concentration is at the bottom of the bag along the outer surfaces thereof, and by shifting the point of maximum stress on the seal from a location of essential coincidence with the location of maximum load concentration to a position remote therefrom, there is less tendency for the bag to tear or break. Also as respects the particular seal illustrated in FIGS. 20 and 21, it has been found that it is easier to create a seal of this type than those heretofore known because less criticality need be observed in the sealing operation in order to obtain seals of uniform strength.

A seal 41 of the type described is formed because of the characteristics of the sealing blade or edge 194 of each of the bottom sealers 193. As is made evident by inspection of FIG. 20, each blade 194 has a varying radial length and the extent to which the blade 194 presses against the webs 31 and 32 to force the same together depends upon the particular area of the blade in engagement with the webs. Thus, the location on the blade 194 at which it presses to the greatest extent against the webs 31 and 32 is along the center portion 212 of the blade, and at every other location therealong the force with which the blade presses against the webs is less. Therefore, as successive points are selected within the arcuate transition area 213 at progressively greater distances from the center portion 212 of the blade, the force with which the upper web 31 is pressed against the underlying web 32 diminishes. Correspondingly, the intensity of the bond established between the webs 31 and 32 will diminish at progressively greater distances from the central area 215 of the seal.

OPERATION

In operation of the machine, parent or supply rolls of webs 31 and 32 are appropriately positioned in the back stand 30, and the size of the rolls and width of the webs will depend upon the particular machine and the run to be performed thereby. By way of example, web widths of approximately sixty-six inches have been used satisfactorily, and webs of such width will produce eight bags concurrently each having a width (including the gussets) of about eight inches, six bags having a width of about ten inches, or five bags having a width of about twelve inches. The webs 31 and 32 are threaded through the machine and at such time the web-slitting and sealing mechanisms 37 are in the retracted position thereof, shown by broken lines in FIGS. 1 and 4, and the cams 188 may also be retracted. Before the machine is set in operation to process the webs 31 and 32, the various blades 71 of the mechanisms 37 must be heated as must the blades 194 of the bottom sealers 193. In each instance the temperatures of the blades 71 and 194 are thermostatically controlled and because of the relatively high temperatures to which the blades 71 are heated, the mechanisms 37 are rotated continuously so as to assure uniformity in the temperatures thereabout and thereby prevent warpage of the shaft 98 which has been found to occur if the shaft and mechanisms 37 mounted thereon are not continuously rotated whenever the blades 71 are being heated.

Prior to the machine being set in operation, air under pressure is supplied to the manifold 152 so as to provide a continuous discharge of air from the nozzles 154 of the gusset-forming mechanism. Also once the blades 71 of the mechanism 37 have been elevated to their proper temperature, coolant is supplied to the tubes 72 and 73 of the plate or shoe 54, and coolant is similarly supplied to the shaft 98 so as to flow through the annular chambers 117 of the various mechanisms 37. The drive components of the machine are energized to initiate movement of the webs 31 and 32 through the various stations of the machine, and the motor means 95 are energized so as to bring the various mechanisms 37 into engagement with the webs at the sealing and slitting station 33. As previously explained, the shaft 98 and mechanisms 37 carried thereby are continuously rotated, and rotation thereof is effected through a separate drive therefor which includes the motor 107 (FIG. 10).

As the webs 31 and 32 are moved downwardly through the slitting and sealing station 33, the heated and rotating slitting blades 71 engage such webs and concurrently sever the same longitudinally and seal the two webs to each other along each such line of severance. Thus, in a single operation and as a result of a single contact with the webs 31 and 32, each blade 71 both severs the webs and seals the same together.

As the webs 31 and 32, which are then in the form of a plurality of bag tubes 39, are advanced downwardly into the gusset-forming station 34 from the sealing and slitting station 33, the sealed edge portions of each tube 39 are folded inwardly by action of the gusset-forming guides 52 (comprising the plates 145 and 146, FIG. 15) together with the air jet discharge from the various tubes 150 which force the longitudinal edge portions of each tube inwardly into the interior of the gusset-forming guides 52. Thus, as the bag tubes 39 pass out of the gusset-forming station 34, the tubes have their longitudinal edges folded inwardly to form pleats or folds which define gussets in the bag products formed from such tubes.

The tubes are then advanced into the bottom-sealing station 35 which includes the rotatable drum 190 and the endless belt 170. As explained heretofore, the pinch or draw rollers 60 and 61 rotate at an angular velocity sufficient to supply the tubes 39 at a slightly higher rate than required by the drum 190 and belt 170 so that the bag tubes are not in a state of tension when the bottom seals 41 are formed thereacross. It will be evident that when the machine is operating, the endless belt 170 is tensioned against the cylindrical surface of the drum 190 by appropriate energization of the motor means 181 (FIG. 16) and that the cams 188 will be in the operative positions thereof, shown in FIG. 16, as a consequence of appropriate energization of the motor means 183.

As the bag tubes are advanced through the bottom-sealing station 35, they are sealed transversely at longitudinally-spaced locations therealong by action of the bottom sealers 193 each of which is cyclically displaced into engagement with the bag tubes by coaction of the cams 188 with the various cam followers 199. The endless belt 170 and drum 190 cooperate in advancing the bag tubes 39 through the bottom-sealing station 35, and because of their coaction they advance the tubes with the application of substantially no tension thereto. Additionally, the belt 170 serves as a somewhat yieldable platen against which the webs are compressed by engagement of the blade 194 of each sealer 193 therewith. It may be observed that the tubes when being sealed transversely have a varying thickness defined by a thickness of four plies along each of the folded edge portions thereof and defined by two plies intermediate such edge portions. Accordingly, the amount of heat applied to such webs must be sufficiently great to completely seal the tubes through the four-ply edge portions thereof while also being sufficiently well controlled so as not to burn or cut through the two-ply areas.

Upon discharge from the bottom-sealing station 35, the bag tubes 39 are provided with transversely extending lines of separation which may take the form of the perforations 42, shown in FIG. 21, so that each tube may be separated into a succession of individual bags each of which is closed at its bottom, open at its upper end, and has gussets along the sides thereof. The particular perforating apparatus and/or collating apparatus used in association with the machine forms no part of the present invention, and for this reason, will not be further described. It is diagrammatically depicted in FIG. 1 by the rollers 218 and 219 which define the bag-separating station 36.

During the slit-sealing operation performed at the station 33, it is necessary to maintain the webs 31 and 32 under appropriate tension as they are engaged by the blades of the web-slitting and sealing mechanisms 37 in order to effect proper separation or slitting of the webs and also proper sealing thereof. In this respect if web tension is too great, the webs tend to pull apart before they are cut through or slit, and if the tension is too small, web separation is irregular and sealing is inadequate. The correct amount of tension is largely determined as an empirical matter and it is adjusted manually until proper slitting and sealing occurs. By way of indicating the order of magnitude of the tensile force usually employed, a force of about five to six ounces per lineal transverse inch of the web is adequate using polyethylene web materials, as explained hereinbefore. Accordingly, where the web width is about 66 inches, the total tensile force across the webs at the station 33 is in the range of about 20 to 25 pounds. Web tension is developed and regulated by a braking action applied to the unwinding of the supply rolls at the back stand in accordance with conventional practice.

MODIFIED WEB-SLITTING AND SEALING MECHANISM

The modified web-slitting and sealing mechanism illustrated in FIGS. 22 and 23 is identical in ultimate function to the web-slitting and sealing mechanism described hereinbefore. In this respect, the modified mechanism includes a plurality of slit-sealing blades that engage the webs 31 and 32 to concurrently sever the same longitudinally and seal the two webs to each other along each such line of severance. There is a departure in structural terms from the prior described mechanism, and such departure essentially resides in elimination of the liquid cooling arrangement included in the mechanisms 37 and replacement with a blade-centering assembly.

More particularly, the modified web-slitting and sealing mechanism includes means for centering and maintaining the various slit-sealing blades centered so as to compensate the same for alignment-destroying expansion otherwise caused by the blades being heated. Such centering means includes an annular abutment ring 220 that slides over the rotatable shaft 221, which shaft corresponds to the shaft 98 in the slitting and sealing mechanism heretofore described. The abutment ring 220 is fixedly secured to the shaft so as to prevent relative movement therebetween, and in this reference the ring is provided with a plurality of radially oriented passages 222 respectively receiving therein a plurality of set screws 223 that bear against the shaft 221.

The abutment ring 220 is provided along the inwardly-facing outer edge thereof with an annular seat or shoulder 224 adapted to receive and seat thereon an annular edge or corner portion 225 of the slit-sealing blade structure 226 which is an annular member and in cross section has the general shape of an I-beam to provide annular recesses or channels along each side thereof in which are respectively located heating elements 227a and 227b. The heating elements 227 are held in place by a pair of relatively heavy rings or washers 228a and 228b which overlie the associated heating elements and are clamped to the blade structure by a plurality of bolts 229. The heating elements 227 are electrically energized, as in the case of the heating elements 122a and 122b heretofore described, and since the heating circuit may be the same, it will not again be described.

Also mounted upon the shaft 221 in coaxially circumjacent relation therewith is a movable centering ring 230 axially slidable along the shaft 221 and provided along the inwardly-facing outer edge thereof with an inclined cam surface 231. The cam surface 231 is substantially continuous in angular extent and it is oriented in facing relation with the shoulder 224 provided by the abutment ring 220 so as to slidingly engage a corner portion or edge 232 of the blade structure 226. The rings 220 and 230 are provided at angularly-spaced locations therealong with respectively alignable passages that extend axially relative to the shaft, and each pair of aligned passages is adapted to receive therewithin an associated screw 233. In this respect, the passage provided by the abutment ring 220 is denoted as 234 and it is threaded so as to cooperatively receive the threaded end portion of such screw 233. The passage provided by the cam ring 230 is denoted 235 and it freely passes the screw 233 therethrough so that relative axial movement between the screw and ring is afforded.

Each screw 233 adjacent the head thereof has a heavy washer 236 mounted thereon that provides a bearing surface or seat for one end of a spring structure 237 circumjacent the screw and interposed between the washer and facing outer surface of the cam ring 230 so as to seat thereagainst. As shown in FIGURE 22, four such screws 233 are provided in the structure being considered and they are angularly spaced from each other by substantially equal arcuate distances. When properly adjusted, the screws 233 are locked to prevent inadvertent loosening thereof by set screws 238 respectively associated therewith and screwed into thread passages 234 in the abutment ring 220.

In the centering assembly described, the abutment ring 220 is fixedly secured to the shaft 221 by the set screws 223 (there being three, as shown in FIG. 22), and after the blade structure 226 is located with respect to the abutment ring 220 so that the annular corner portion 225 of the blade structure is seated upon the shoulder 224, the cam ring 230 is drawn toward the abutment ring 220 by tightening the various screws 233, which tightening thereof positively seats the blade structure 226 against the shoulder 224 and upon the cam surface 231 and thereby properly centers the blade structure. The centering force is applied through the various springs 237 which resiliently urge the cam ring 230 toward the abutment ring 220; and as the blade structure expands radially outwardly as a consequence of being heated by the elements 227a and 227b, the spring structures 237 continuously urge the cam ring 230 inwardly toward the abutment ring 220 thereby maintaining the corner portion 225 of the blade structure in engagement with the outwardly extending wall portion of the shoulder 224 and the edge portion 232 of the blade structure in engagement with the cam surface 231.

Thus, the cooperative relationship defined by the rings 220 and 230 together with the spring structures 237 and screws 233 maintain the blade structure 226 in a predetermined location along the shaft 221 irrespective of temperature-induced changes in the diameter of the blade structure because when it increases slightly in diameter as a consequence of being heated, the ring 230 and cam 231 move inwardly under the influence of the springs 237 to take up the slack, and when the blade structure cools and contracts toward the shaft 221, the cam ring 230 is displaced outwardly to the extent necessary against the biasing force of the springs 237. Accordingly, in each of the modified web-slitting and sealing mechanisms means are included to center and maintain its blade structure 226 in a predetermined condition of alignment as the blades are heated, and no arrangement is included for removing heat from the structures. In contrast, in the prior-described web-slitting and sealing mechanisms 37, a cooling system is employed to prevent the blades from attaining temperatures which might cause misalignment.

While in the foregoing specification embodiments of the invention have been set forth in considerable detail for purposes of making a complete disclosure thereof, it will be apparent to those skilled in the art that numerous changes may be made in such details without departing from the spirit and principles of the invention.

What is claimed is:

1. In a method of making bags and the like from flexible heat-sealable material, the steps of advancing longitudinally along a predetermined path a pair of continuous webs of such material oriented in superposed juxtaposition, at transversely-spaced locations across such path severing the juxtaposed webs along longitudinally extending lines and substantially concurrently therewith heat sealing the juxtaposed webs along such longitudinally-extending lines of severance to form a plurality of bag tubes with heat sealed seams extending longitudinally along said lines, following said heat sealing deforming a plurality of opposite surface portions of the juxtaposed webs inwardly by directing air against surface portions of the juxtaposed webs adjacent and seat sealed seams to provide opposite gusset-forming folds along each of the seams of such bag tubes, providing a supporting surface, while the thus gusseted tubes are being advanced guiding them in substantially flat condition over said supporting surface, at longitudinally-spaced locations along said tubes forming bottom closure seals along transversely-extending areas thereacross by providing a heated member, and moving said member over said supporting surface at substantially the same linear velocity as the tubes are advanced over said surface while pressing said member against said tubes, and subsequently forming lines of weakness transversely across said tubes at longitudinally-spaced locations to enable each tube to be separated into a plurality of individual bags.

2. In a method of making bags and the like from flexible heat-sealable material, the steps of advancing longitudinally along a predetermined path a pair of continuous webs of such material oriented in superposed juxtaposition, at transversely-spaced locations across such path applying to narrow longitudinally-extending areas of said webs heat which is controlled to a value sufficient to sever the juxtaposed webs at such spaced locations along longitudinally-extending lines and to effect substantially concurrently therewith sealing of the juxtaposed webs along such longitudinally-extending lines of severance to form a plurality of bag tubes, impinging air against surface portions of said juxtaposed webs adjacent the sealed longitudinally-extending lines of severance to deflect such surface portions inwardly to provide gusset-forming folds along each of said bag tubes, at longitudinally-spaced locations along the sealed and folded tubes applying heat to said tubes controlled to a value sufficient to effect sealing thereacross at transversely-extending areas to form bottom closures for such bags, said heat being applied by a heated blade movable in a direction of and along such path through an arc substantially tangent thereto, the blade being provided with a relieved surface so as to engage the bag tubes with varying degrees of force along any such transversely-extending area to press the facing surfaces of said bag tubes into intimate contact along each such transversely-extending area with a force the magnitude of which varies along the longitudinal extent of the area to provide a bottom closure seal of varying intensity, and forming lines of weakness transversely across said tubes at longitudinally-spaced locations to enable each bag to be separated into a plurality of successive bags.

3. In the method of making bags and the like from flexible heat-sealable material, the steps of advancing longitudinally along a pre-determined path a pair of continuous webs of such material oriented in superposed juxtaposition, at transversely spaced apart locations across such path severing the juxtaposed webs along longitudinally extending lines and substantially concurrently therewith heat sealing said webs together along said longitudinally extending lines to form a bag tube with heat sealed seams along said lines, following said heat sealing of said seams providing spaced apart guide members to form a guideway for passage of the tube therethrough and which is open at opposite sides adjacent said seams, continuously moving said tube through said guideway and while the tube is thus continuously moved directing air inwardly through each open side of the guideway against a surface portion of the tube adjacent the heat sealed seam to deflect such portion inwardly and project the seam between said guide members.

4. In the method of making bags and the like from flexible heat sealable material, the steps of advancing longitudinally in one general direction along a predetermined path continuous webs of said material in superposed juxtaposition, forming a heat sealed seam between said webs extending longitudinally in the direction of said advancement to provide a bag tube, following formation of said heat sealed seam forming a gusset in such tube along said seam by providing spaced apart substantially fixed guide members to provide a fixed passage therebetween open at a side thereof, continuously moving the heat sealed webs through said passage between said fixed members, and while said webs are thus continuously moved directing air inwardly through said open side between said guide members and against a surface portion of the webs adjacent said heat sealed seam to deflect the seam portion inwardly between said fixed guide members.

References Cited

UNITED STATES PATENTS

| | | | |
|---|---|---|---|
| Re. 26,075 | 9/1966 | Canno | 93—35 X |
| 2,631,332 | 3/1953 | Reber | 93—84 |
| 3,054,441 | 9/1962 | Gex | 53—182 X |
| 3,150,576 | 9/1964 | Gewiss | 93—84 |
| 3,152,501 | 10/1964 | Nassar | 93—58 |
| 3,210,908 | 10/1965 | Samberg | 53—182 |
| 3,358,823 | 12/1967 | Paxton | 93—58 |
| 3,361,041 | 1/1968 | Grob | 93—84 |
| 3,372,625 | 3/1968 | Simecek | 93—35 |
| 3,384,528 | 5/1968 | Lehmacher | 93—33 X |
| 3,397,508 | 8/1968 | Stroop | 93—33 X |
| 3,406,612 | 10/1968 | Terzuoli | 93—58 |
| 2,004,041 | 6/1935 | Driver | 93—33 |
| 2,805,973 | 9/1957 | Klasing | 93—35 |
| 3,033,257 | 5/1962 | Weber | 53—28 X |
| 3,156,010 | 11/1964 | Osborn | 18—14 |
| 3,383,269 | 5/1968 | Kopp | 53—28 X |
| 3,438,173 | 4/1969 | Omori | 53—182 X |
| 3,439,471 | 4/1969 | Kraft | 53—182 |
| 3,439,591 | 4/1969 | Class | 93—35 |
| 3,408,903 | 11/1958 | Lepisto | 93—84 |

FOREIGN PATENTS

39/14,452  7/1964  Japan.

WAYNE A. MORSE, JR., Primary Examiner

U.S. Cl. X.R.

53—182; 93—33, 58, 84